Patented Dec. 9, 1941

2,265,547

UNITED STATES PATENT OFFICE 2,265,547

COLOR PHOTOGRAPHY

Wilhelm Schneider, Dessau, Germany, assignor, by mesne assignments, to General Aniline & Film Corporation, New York, N. Y., a corporation of Delaware Application April 15, 1938, Serial No. 202,257
In Germany April 19, 1937

1 Claim. (Cl. 95—2)

This invention relates to color photography and more particularly to a method of printing subtractive color negatives onto a suitable positive material.

Hitherto the production of prints of originals, whether negative or positive, which have been made by the subtractive method, consisted, apart from the process which uses the component pictures and the combined copies thereof on a new material, in the use of a multi-layer material similar to the original and therefore made in respect of coloring and sensitizing like the original material.

By printing on such a material, as has been frequently recognized, insufficiently pure colors are obtained and in each copying process an unavoidable loss of gradation and of color units occurs and with this there is a darkening of the color to an injurious degree. It has been proposed that, in producing the printing material, instead of sensitizing in the red of the same spectral zone as in the original material, there should be sensitization in the infra-red and in this manner there has in fact been obtained a better color reproduction in this part of the spectrum.

It is an object of the present invention to provide a method by which essentially improved subtractive color positives may be obtained.

A further object is the provision of a positive and negative material by the use of which a darkening of the successive prints is precluded.

A further object is the provision of a process which makes it possible to produce a correct print in color directly from a colored master picture.

Figure 1:
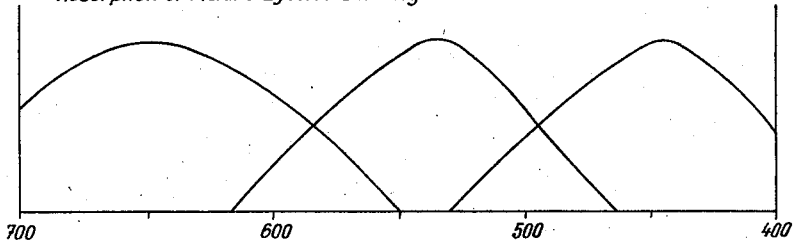
Figure 2:
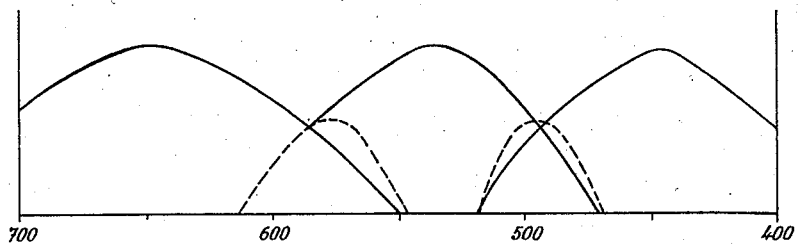
Figure 3:
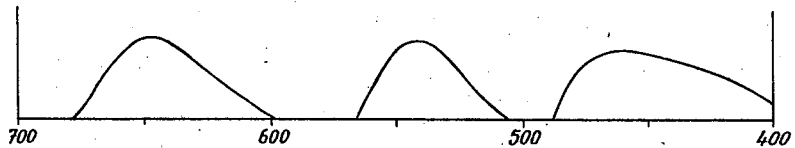

Further objects will become apparent from the following detailed description and the annexed drawing in which Fig. 1 indicates the absorption of the dyestuffs which form the color picture in the negative material or master picture, whereas Fig. 2 shows the absorption of the same negative material where the overlapping parts are filtered out by means of filter dyes (indicated by dotted lines), and Fig. 3 shows the sensitization of the positive or printing material according to my invention.

This invention is based on the observation and recognition of the factors which govern the darkening of the reproduction, and consists in a method by which the darkening is avoided so that it becomes possible to attain the desired goal, namely a direct color copy without the circuitous method of producing components. For this purpose there is used a special position of the sensitizing maxima of the layers of the reproduction material and advantageously at the same time certain filters in order to obtain this pure reproduction of color; furthermore the sensitizing maxima and the position of the filters are so interconnected that as compared with the position in the exposure material the sensitizing maxima of the copying material lie at the points where the absorption maxima of the dyestuffs are in the original, whether this is negative or positive in nature. The filter, on the other hand, must cover those spectral regions which are within the injurious overlapping absorption regions of the dyestuffs of the original on the one hand. On the other hand it must cover the overlapping regions of the sensitizing dyestuffs which may still occur in spite of the employment of dyes with distinct absorption bands. Since the invention made it necessary that the absorption maxima of the dyestuffs of the print and the sensitizing maxima of the copying film are identical it is clear that the overlapping regions both of the picture dyestuffs and of the sensitizing dyestuffs also must lie in similar regions of the spectrum, so that it is thus possible to provide filters which, owing to suitable choice of the original dyestuffs as well as the reproduction sensitizers, cover the two overlapping regions.

If, therefore, the spectrum of the negative material is to be as true a picture as possible of the sun spectrum with all the mixed colors, as is desirable in order to reproduce as truly as possible all the natural colors, the sensitizing spectrum of the copying material should show only three sharp bands in the blue, green and red regions and so far as this is not possible by choice of the sensitizers, the overlappings which still exist should be covered by direct choice of the printing light, that is to say of the filter. As, further, these sensitizing ranges and the absorption maxima of the dyestuffs forming the picture are to lie in like positions the filter should automatically cover the overlapping regions of the dyestuffs.

It follows that such dyestuffs should be selected as have their absorption maximum in the region which they are to cover. In known manner dyestuff solutions may be used or colored layers, for example colored gelatin. The filter may consist, if desired, of several individual filters for the individual overlapping regions arranged one behind the other, or there may be several dyestuffs in solution or in a layer. In the latter case particularly, the manipulation is simple as compared with the use of additive filters.

If, for example, a copy is used the dyestuffs of which cover 580 to 620 mμ and 480 to 520 mμ a copying filter may be inserted which contains Crystal Violet and β-naphthoxocarbocyanine which absorb in these regions respectively.

The printing material is so sensitized that the maximum of sensitivity of the middle layer is 545 mμ and that of the layer adjacent the support is 680 mμ.

The process is applicable for making copies in color negatives and positives which may be made by any desired process. As copying material any multi-layer material may be used in which the color pictures are produced in various ways; especially suitable as layers for the copying material are the silver halide emulsion layers described in U. S. Patents Numbers 2,178,612; 2,179,228; 2,179,238; 2,179,244; 2,186,730; 2,186,732; 2,186,733; 2,186,734; 2,186,735; 2,186,849; 2,186,851, and application Serial No. 111,250, filed Nov. 17, 1936, in which the color pictures are produced by color development, according to the silver bleaching-out process, or according to the anti-diazotate process.

What I claim is:

The method of producing colored prints from subtractive master pictures which comprises illuminating a multi-layer color photographic light-sensitive element through a subtractive master picture and a series of filters, said multi-layer color photographic light-sensitive element being sensitized with dyestuffs, the sensitizing maxima of which correspond substantially with the maxima of absorption of the picture dyestuffs of said master image and the sensitizing ranges of which overlap within substantially the same spectral range as the overlap of absorptions of said picture dyestuffs, said filters operating to absorb those wave lengths of the printing light which correspond substantially to the overlapping regions of said picture dyes and to the overlapping regions of sensitivity of said sensitizing dyestuffs.

WILHELM SCHNEIDER.